United States Patent Office 3,230,031
Patented Jan. 18, 1966

3,230,031
PROCESS FOR MAKING ARYLOXYETHYLSULFONYLETHYL ETHERS OF CELLULOSE
Clark M. Welch, New Orleans, La., assignor to the United States of America as represented by the Secretary of Agriculture
No Drawing. Filed Feb. 6, 1962, Ser. No. 171,536
7 Claims. (Cl. 8—120)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the attachment of phenols to cellulose with divinyl sulfone to give hitherto unknown aryloxyethylsulfonylethyl ethers of cellulose, with the simultaneous formation of crosslinks in the cellulose by divinyl sulfone present as such or as its addition products with phenols. The process affords a method of durably attaching to cellulose materials such as cotton textiles, those dyes, rotproofing agents, and other textile finishing agents which are phenols. Simultaneous with such attachment, crosslinking of the cellulose occurs and the cellulosic fibers are rendered insoluble in cupriethylenediamine solution. Durable wrinkle resistance and wash-wear properties can be imparted to cellulosic fabrics, along with increased resistance to shrinkage and stretching. If the phenol which is attached contains dye-receptive groups in its molecules, the affinity of the cellulosic textile for dyes is greatly enhanced by such treatment.

The process, when conducted in a single step, consists of two competing reactions, (a) and (b), which are as follows:

(a)

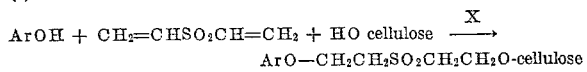

(b)

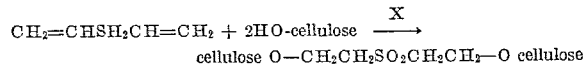

Here $Ar(OH)_m$ is a phenol whose molecules have one or more hydroxyl groups attached to an aromatic ring or to a system of fused aromatic rings, $m$ representing the number of such hydroxyl groups, HO-cellulose is a portion of the cellulose chain and X is a base used as the catalyst. The process may be carried out by applying the reagents and catalyst in one solution to the cellulose, followed by curing at elevated temperatures. Alternatively, it may be conducted as a two-step process comprising the following reactions:

(Step 1)

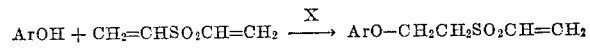

(Step 2)

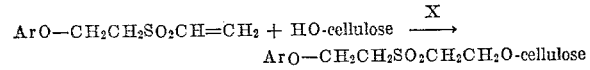

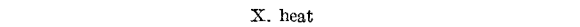

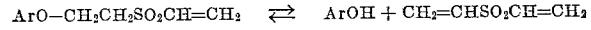

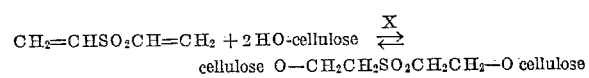

In Step 1, the combining mole ratio of the phenol to the divinyl sulfone is 1:$n$, where $n$ is the number of hydroxyl groups attached to aromatic rings in each molecule of the phenol. The resulting addition products or adducts are 2-(aryloxy)ethyl vinyl sulfones. Such adducts may be prepared separately and stored for later use. They are a new class of compound. The only previously reported adducts of phenols with divinyl sulfone have two moles of the phenol combined with each mole of divinyl sulfone (Alexander and McCombie, J. Chem. Soc., 1913 (1931)). Such 2:1 adducts are bis[2-(aryloxy)ethyl] sulfones. They can also be applied to cellulose in the present process, however, since they redissociate to 2-(aryloxy)ethyl vinyl sulfones when heated with the base catalysts used in applying the adducts to cellulose. The 2:1 adducts have the disadvantage of requiring extra amounts of the phenol for their preparation, the extra phenol being wasted upon subsequent redissociation of the 2:1 adducts during their application to cellulose. Neither the adducts mentioned above nor mixtures of phenols with divinyl sulfone have hitherto been applied to cellulose in the presence of a catalyst to form aryloxyethylsulfonylethyl ethers of cellulose, with simultaneous crosslinking of the cellulose. The use of preformed adducts (the two-step method) is frequently preferable to the use of mixtures of phenols with divinyl sulfone (the one-step method). The adducts are odorless and of low toxicity in contrast to divinyl sulfone, which is highly lachrymatory, irritating to mucous membrane and toxic.

Regardless of which method of application is chosen, it is possible to exert some control over the extent to which attachment of aryloxyethylsulfonylethyl groups occurs, as compared with the extent of crosslinking that also occurs. The use of phenols of high acidity favors crosslinking, as is also true of the use of high curing temperatures, and strong alkalies as catalyst.

The process is applicable to phenols of high molecular weight and complexity as well as to the simplest types. The efficiency of attachment to cellulose is greatest for those phenols having several hydroxyl groups per molecule. The efficiency of both the attachment and crosslinking reactions is much greater for water-soluble phenols than for water-insoluble types. The presence in the phenol of a solubilizing group such as a carboxyl or sulfo group, which in alkaline solution gives rise to soluble salt formation, is of great assistance. Such groups render soluble the adduct that is formed from the phenol and divinyl sulfone.

Catalysts which may be used in treating cellulose by the processes of this invention are bases such as alkali metal carbonates and bicarbonates, alkali or alkaline earth metal hydroxides, alkali metal phenoxides, and organic quaternary ammonium carbonates, bicarbonates, phenoxides, and hydroxides. Hydroxides have the disadvantage of causing adducts to dissociate partially at room temperature to give the irritating odor of divinyl sulfone; hence the other bases are preferred. When the catalyst is applied to the cellulose from the same aqueous solution as the phenol and the dinvyl sulfone, or is applied together with the phenol-divinyl sulfone adduct in aqueous solution, the catalyst concentration should not be so high that it causes the reagents to precipitate or react with water. Catalyst concentrations of 0.5–30% may be used with preferred concentrations being 1.0–2.5%. Higher concentrations are useful where the catalyst is applied separately. In applying a mixture of a phenol and divinyl sulfone to cellulose, a phenol/divinyl sulfone mole ratio in the range of 0.01/1 to 3/1 may be used, the lower ratios giving the most efficient attachment of the phenol to cellulose. Water-insoluble phenols and adducts may be applied from inert organic solvents followed by drying to remove the solvent. The catalyst alone or with divinyl sulfone is then applied separately from aqueous solution. After the reagents and catalysts have been applied, the fabric is kept at 20–170° C. for 0.5–30 minutes. The stronger the base used as catalyst and the greater its concentration, the lower is the temperature required for reaction.

The preparation of phenol-divinyl sulfone adducts is simple and rapid. The base used as a catalyst for the adduct preparation is preferably one that is soluble in the mixture of reactants, or in a water solution of the reactants, and that reacts with phenols to give soluble phenoxides. Suitable bases are alkali metal carbonates, hydroxides and phenoxides, tertiary amines, and quaternary ammonium carbonates, hydroxides and phenoxides. Catalyst concentrations of 0.1–10% may be used.

The reaction of the phenol with divinyl sulfone may be conducted by heating a mixture of the catalyst, the phenol and divinyl sulfone to a temperature that depends on the catalyst concentration and the presence or absence of a solvent, but falls within the range of 20–150° C. Once initiated, the reaction is noticeably exothermic, when no solvent is present to dissipate the heat evolved. Phenol/divinyl sulfone mole ratios in the range of 0.01/1 to 100/1 may be used, although mole ratios of $0.5/n$ to $1.5/n$ are preferred since they give the largest proportion of aryloxyethyl vinyl sulfones in the product. For phenols not highly soluble in divinyl sulfone, the presence of a polar solvent such as water or an alcohol is advantageous. The resulting adducts are usually crystalline compounds that may be isolated by ordinary methods or may be stored in solution. Extraction of the solutions with inert water-immiscible solvents such as aromatic hydrocarbons removes traces of unreacted divinyl sulfone, thus removing the irritating odor of the divinyl sulfone.

The following examples illustrate methods of preparing the adducts and of treating cellulose. Crease recovery angles cited are the sum of the values measured in the warp and fill directions by the Monsanto crease recovery test. The adaptation of Lawrence and Phillips, Am. Dyestuff Reptr., 45, p. 548 (1956), was used for crease recovery tests in the wet state. A Scott tester was used for breaking strength determinations. The cellulosic fabric used was desized, scoured and bleached 80×80 cotton print cloth.

Example 1

The 1:1 adduct of phenol with divinyl sulfone was prepared as follows: to 4.7 g. (0.05 mole) of phenol was added 7.5 ml. (0.075 mole) of divinyl sulfone. To the clear solution was added 0.10 g. of sodium hydroxide, the solid being crushed to small particles. The mixture was warmed with stirring to 85° C., whereupon an exothermic reaction occurred. The temperature rose gradually and spontaneously to 95° C., whereupon sufficient cooling was applied to prevent further rise. After a few minutes the evolution of heat ceased. The mixture was warmed to keep it at 90° for 5 minutes longer, and then was cooled to room temperature. The viscous syrup was stirred with three 40 ml. portions of water, causing it to solidify gradually. The solid was broken up and stirred with a solution of 0.2 ml. of acetic acid in 40 ml. of water.

The solid was removed by suction filtration and dissolved in 100 ml. of hot methanol. The solution was cooled until crystallization began, then was re-warmed until most of the solid redissolved. It was now slowly cooled to 4° C. in the presence of a few of the crystals. The solid by-product was removed by filtration. The filtrate was concentrated to 40 ml. and cooled to 4° C. in the presence of a few crystals of the solid. The solid that came down was separated by suction filtration. It weighed 5.74 g. and melted at 76–81° C. It was dissolved in 100 ml. of warm t-butyl alcohol and 100 ml. of petroleum ether (B.P. 30–60°) was added. The mixture was stirred and cooled to 20°, and decanted from a brown gummy by-product, as soon as a white solid began to crystallize. The decanted solution was chilled with stirring to 3° C. and filtered by suction, giving 3.69 g. of solid melting at 79.5–83.0°, and containing 14.7% sulfur.

A 1.00 g. sample of this material was dissolved in 50 ml. of hot carbon tetrachloride and 2 g. of Nuchar decolorizing carbon was added. The mixture was boiled for 20 min. and filtered by suction. The charcoal was again boiled with 50 ml. of carbon tetrachloride and filtered. The filtrates evaporated to a combined volume of 20 ml. yielded 0.52 g. of 2-(phenoxy)ethyl vinyl sulfone melting at 84.0–85.0° C.

Example 2

The 1:1 adduct of phenol with divinyl sulfone prepared as in Example 1 was used to treat print cloth. The cloth was soaked in a solution of 1.0 g. of adduct in 10 ml. of benzene at 30° C., was oven-dried at 75° C. for 3 minutes, and was then soaked in a solution of 0.8 g. of sodium bicarbonate in 24 ml. of water containing 0.25 g. of sodium lauryl sulfate as a wetting agent. The cloth was now cured in a forced-draft oven at 135° C. for 5 min. It was washed in hot water for 15 minutes, dried at 135°, and boiled in two 100 ml. portions of benzene for periods of 5 minutes each to extract any unreacted adduct. The fabric was then dried and allowed to equilibrate with air of ordinary humidity.

Fibers of the treated fabric were insoluble in cupriethylenediamine solution, whereas fibers of untreated fabric readily dissolved. This indicates the treated cotton was crosslinked.

Example 3

A solution of the 1:1 adduct of sodium p-phenolsulfonate with divinyl sulfone was prepared as follows: a mixture of 5 ml. (0.05 mole) of divinyl sulfone, 9.8 g. (0.05 mole) of sodium p-phenolsulfonate, 0.2 g. of sodium hydroxide and 15 ml. of water was heated to 100°, the sodium p-phenolsulfonate going into solution at 55°. The mixture was kept at 100° for 30 min., and was then cooled to room temperature giving a pasty mass, to which was added 15 ml. of water to replace evaporation losses. The resulting clear solution was extracted with three 20 ml. portions of benzene. Evaporation of the benzene gave 0.3 ml. of unreacted divinyl sulfone. The 26 ml. of aqueous phase was odorless, weighed 32 g. and contained about 50% by weight of the highly soluble adduct.

Example 4

Print cloth was treated with a mixture prepared from 8 ml. of the sodium p-phenolsulfonate adduct solution obtained as in Example 3, 0.50 g. of sodium carbonate and 16 ml. of water. The cloth was padded with the solution in one dip and one nip to a wet pickup of 92–94%. It was then cured in a forced-draft oven at a specified temperature for 5 minutes. The cloth was rinsed in cold water, washed for 15 minutes in hot water, was oven-dried at 75° C., and equilibrated in air of ordinary humidity. The properties imparted to the fabric were as follows:

| Cure Temp. | Weight Gain, percent | Percent Sulfur | Crease Recovery, degrees | | Brk. Strength Loss,[a] percent |
|---|---|---|---|---|---|
| | | | Wet | Dry | |
| 135° C. | 3 | | 228 | 217 | 20 |
| 160° C. | 5 | 1.07 | 239 | 231 | 25 |
| Untreated fabric | | | 163 | 155 | |

[a] At constant thread count.

The treated fabrics were deeply dyed after being soaked in hot aqueous methylene blue and then washed for 30 minutes in hot water. The untreated fabric was only a pale blue. This shows the presence of anionic groups in the treated cotton, indicating sodium p-phenolsulfonate had been attached to the cellulose.

*Example 5*

A mixture of the 1:1 and 2:1 adducts of sodium p-phenolsulfonate with divinyl sulfone was prepared from 5 ml. (0.05 mole) of divinyl sulfone, 11.6 g. (0.059 mole) of sodium p-phenolsulfonate, 0.1 g. of sodium hydroxide and 20 ml. of water. The mixture of reactants was heated to 100° and kept at that temperature for 30 minutes. It was cooled to room temperature and diluted with 16 ml. of water to replace evaporation losses. A clear solution weighing 37 g. was now obtained, whereas the original phenol was only sparingly soluble at room temperature.

The solution was extracted with three 20 ml. portions of benzene. Evaporation of the benzene extracts gave 0.8 ml. of unreacted divinyl sulfone. The odorless aqueous phase (31 ml., 36 g.) contained about 45% by weight of adducts.

*Example 6*

Print cloth was treated with the sodium p-phenolsulfonate adduct solution described in Example 5, after the adduct solution had been diluted with water to a specified concentration and 2% by weight of sodium carbonate, based on the total weight of the diluted solution, had been added. The cloth was padded in one dip and one nip to a wet pickup of 92–98%, and was cured at 135° C. for 5 minutes. It was rinsed in cold water, washed 15 minutes in hot water, was dried at 75° C. and was equilibrated in air at ordinary humidity.

The properties imparted to the fabric were as follows:

| Adduct Conc. | Weight Gain, percent | Sulfur Content, percent | Crease Recovery, degrees | | Brk. Strength Loss a, percent |
|---|---|---|---|---|---|
| | | | Wet | Dry | |
| 23% | 5 | 0.95 | 227 | 218 | 22 |
| 33% | 5 | .95 | 226 | 229 | 25 |
| Untreated fabric | | | 163 | 155 | | a At constant thread count.

The treated fabrics were deeply dyed by hot aqueous methylene blue whereas untreated fabric was not. This indicated anionic groups had been attached to the cellulose.

*Example 7*

The 2:1 adduct of sodium p-phenolsulfonate with divinyl sulfone was prepared as follows: a mixture of 5 ml. (0.05 mole) of divinyl sulfone, 19.6 g. (0.10 mole) of sodium p-phenolsulfonate, 0.2 g. of crushed sodium hydroxide, and 20 ml. of water was heated to 100° C. for 30 minutes, the phenol dissolving at temperatures above 70°. Subsequently, the mixture was cooled to room temperature and 20 ml. of water was added to replace evaporation losses. The solution was extracted with three 50 ml. portions of benzene. Evaporation of the benzene extracts gave 0.2 ml. of unreacted divinyl sulfone. The odorless aqueous phase weighed 55 g. and contained about 45% of the adduct. It was further diluted soon after its preparation, as the concentrated solution began to crystallize after standing for several days.

*Example 8*

Print cloth was treated with the sodium p-phenolsulfonate adduct solution described in Example 7, after the adduct solution had been diluted with water to a specified concentration and 2% by weight of sodium carbonate, based on the total weight of the diluted solution, had been added. The cloth was padded in one dip and one nip to a wet pickup of 89–97%, and was cured at 160° C. for 5 minutes. It was rinsed in cold water, washed 15 minutes in hot water, and was dried at 75° C. and equilibrated in air at ordinary humidity. The properties imparted to the fabric were as follows:

| Adduct. Conc. | Weight Gain, percent | Crease Recovery, degrees | | Brk. Strength Loss a, percent |
|---|---|---|---|---|
| | | Wet | Dry | |
| 15% | 4 | 231 | 235 | 23 |
| 23% | 4 | 242 | 224 | 27 |
| Untreated fabric | | 163 | 155 | | a At constant thread count.

The treated fabrics were deeply dyed by hot aqueous methylene blue whereas untreated fabric was not. This indicated sodium p-phenolsulfonate had been attached. Simultaneously with this attachment, crosslinking also occured, as shown by the enhanced crease recovery angles.

*Example 9*

The attachment of orange II, a phenolic dye, to print cloth by means of divinyl sulfone was carried out as follows: an aqueous solution containing 0.33% by weight of the dye, 10% of divinyl sulfone and 1.7% of sodium carbonate was prepared. The fabric was soaked in this solution, and was subsequently cured at 135° C. for 10 minutes. The washed, dried and air-equilibrated fabric was a bright orange in color, and was wrinkle resistant in both the wet and dry states. That the dye was attached to the cellulose molecules was shown by the fact that it could not be extracted with hot water, acetic acid or pyridine. The color was not faded by brief contact with concentrated ammonia or 20% sodium hydroxide at room temperature.

I claim:
1. A process for the preparation of crosslinked aryloxyethylsulfonylethyl ethers of cellulose that in the form of textile fabrics exhibit wet and dry wrinkle resistance and enhanced dimensional stability, which process comprises wetting the cellulose with an aqueous solution that contains from about 0.5% to about 30% by weight of an alkaline catalyst together with an adduct of divinyl sulfone and a phenol, and keeping the wetted cellulose at a temperature of from 20° to 170° C. for from 0.5 to 30 minutes.
2. The process of claim 1 wherein the molar ratio of divinyl sulfone to phenol in the adduct is 1 mole of divinyl sulfone to each phenolic hydroxyl group per mole of phenol.
3. The process of claim 2 wherein the adduct is a 2-(aryloxy)ethyl vinyl sulfone.
4. The process of claim 2 wherein the adduct is 2-(phenoxy)ethyl vinyl sulfone.
5. The process of claim 2 wherein the adduct is 2-(p-sulfophenoxy)ethyl vinyl sulfone sodium salt.
6. The process of claim 1 wherein the adduct is a bis-[2-(aryloxy)ethyl] sulfone.
7. The process of claim 6 wherein the adduct is bis-[2-p-sulfophenoxy)ethyl] sulfone sodium salt.

(References on following page)

References Cited by the Examiner

UNITED STATES PATENTS

| | | | |
|---|---|---|---|
| 2,470,077 | 5/1949 | Fincke | 260—607 |
| 2,524,399 | 10/1950 | Schoene et al. | 8—116 |
| 2,573,580 | 10/1951 | Ladd | 260—607 |
| 2,988,417 | 6/1961 | Emmons | 8—116 |
| 3,046,075 | 7/1962 | Kantner. | |

FOREIGN PATENTS

| | | |
|---|---|---|
| 936,479 | 9/1963 | Great Britain. |
| 255,967 | 2/1960. | Spain. |

OTHER REFERENCES

Welch et al., Textile Research Journal, January 1961, pp. 84–86.

NORMAN G. TORCHIN, *Primary Examiner.*

JULIAN LEVITT, ABRAHAM H. WINKLESTEIN, *Examiners.*

JAMES C. CANNON, *Assistant Examiner.*